United States Patent
Kim

(10) Patent No.: US 10,637,012 B2
(45) Date of Patent: Apr. 28, 2020

(54) BATTERY CELL HAVING IMPROVED RELIABILITY OF PREVENTING HUMIDITY PENETRATION

(71) Applicant: LG Chem, Ltd., Seoul (KR)

(72) Inventor: Seong Min Kim, Daejeon (KR)

(73) Assignee: LG Chem, Ltd. (KR)

( * ) Notice: Subject to any disclaimer, the term of this patent is extended or adjusted under 35 U.S.C. 154(b) by 194 days.

(21) Appl. No.: 15/735,011

(22) PCT Filed: Jul. 20, 2016

(86) PCT No.: PCT/KR2016/007869
§ 371 (c)(1),
(2) Date: Dec. 8, 2017

(87) PCT Pub. No.: WO2017/026688
PCT Pub. Date: Feb. 16, 2017

(65) Prior Publication Data
US 2018/0166664 A1 Jun. 14, 2018

(30) Foreign Application Priority Data
Aug. 12, 2015 (KR) .................. 10-2015-0113632

(51) Int. Cl.
*H01M 2/02* (2006.01)
*H01M 2/08* (2006.01)
(Continued)

(52) U.S. Cl.
CPC ......... *H01M 2/0287* (2013.01); *H01M 2/026* (2013.01); *H01M 2/0207* (2013.01);
(Continued)

(58) Field of Classification Search
CPC .. H01M 2/0207; H01M 2/0287; H01M 2/026; H01M 2/0267; H01M 2/0275;
(Continued)

(56) References Cited

U.S. PATENT DOCUMENTS

2003/0118900 A1 6/2003 Otohata
2010/0310930 A1 12/2010 Park et al.
(Continued)

FOREIGN PATENT DOCUMENTS

EP 1182714 A1 2/2002
EP 2405506 A2 1/2012
(Continued)

OTHER PUBLICATIONS

Machine translation of JP 2002-334682 (no date).*
(Continued)

*Primary Examiner* — Amanda C. Walke
(74) *Attorney, Agent, or Firm* — Lerner, David, Littenberg, Krumholz & Mentlik, LLP

(57) ABSTRACT

Disclosed herein is a battery cell including a battery case, wherein the battery case includes thermally bondable portions thermally bonded to each other to constitute a first sealed portion of the battery cell, a first space for receiving an electrode assembly, and second spaces defined outside the thermally bondable portions, the second spaces constituting the outer edges of the battery case together with the thermally bondable portions, and wherein a metal piece for preventing the penetration of humidity into the first space from the outside is mounted in at least one of the second spaces.

22 Claims, 9 Drawing Sheets

(51) Int. Cl.
*H01M 2/10* (2006.01)
*H01M 10/0525* (2010.01)
*H01M 10/0585* (2010.01)

(52) U.S. Cl.
CPC ....... *H01M 2/0267* (2013.01); *H01M 2/0275* (2013.01); *H01M 2/0285* (2013.01); *H01M 2/08* (2013.01); *H01M 2/1061* (2013.01); *H01M 10/0525* (2013.01); *H01M 10/0585* (2013.01); *H01M 2220/30* (2013.01)

(58) Field of Classification Search
CPC .... H01M 2/0285; H01M 2/08; H01M 2/1061; H01M 2/02
USPC .......................................................... 429/163
See application file for complete search history.

(56) References Cited

U.S. PATENT DOCUMENTS

| | | | |
|---|---|---|---|
| 2011/0008666 | A1 | 1/2011 | Yoon et al. |
| 2015/0155530 | A1* | 6/2015 | Takahashi ........... H01M 2/0275 429/127 |
| 2017/0207465 | A1* | 7/2017 | Nishimura ............ H01M 6/187 |
| 2018/0009204 | A1* | 1/2018 | Higuchi ................. B32B 27/30 |
| 2019/0190099 | A1* | 6/2019 | Katase ................... H01M 2/02 |

FOREIGN PATENT DOCUMENTS

| | | |
|---|---|---|
| JP | H11104859 A | 4/1999 |
| JP | 2000208111 A | 7/2000 |
| JP | 2000223090 A | 8/2000 |
| JP | 2000277066 A | 10/2000 |
| JP | 2002334682 A | 11/2002 |
| JP | 2011108538 A | 6/2011 |
| JP | 2012519366 A | 8/2012 |
| KR | 20080005627 A | 1/2008 |
| KR | 20120069319 A | 6/2012 |
| KR | 20120136718 A | 12/2012 |
| WO | 2001056096 A1 | 8/2001 |

OTHER PUBLICATIONS

Machine translation of JP H 11-104859 (no date).*
Search report from International Application No. PCT/KR2016/007869 dated Oct. 25, 2016.
Extended European Search Report including Written Opinion for Application No. EP 16835329 dated Mar. 26, 2019.

* cited by examiner

[FIG. 1]
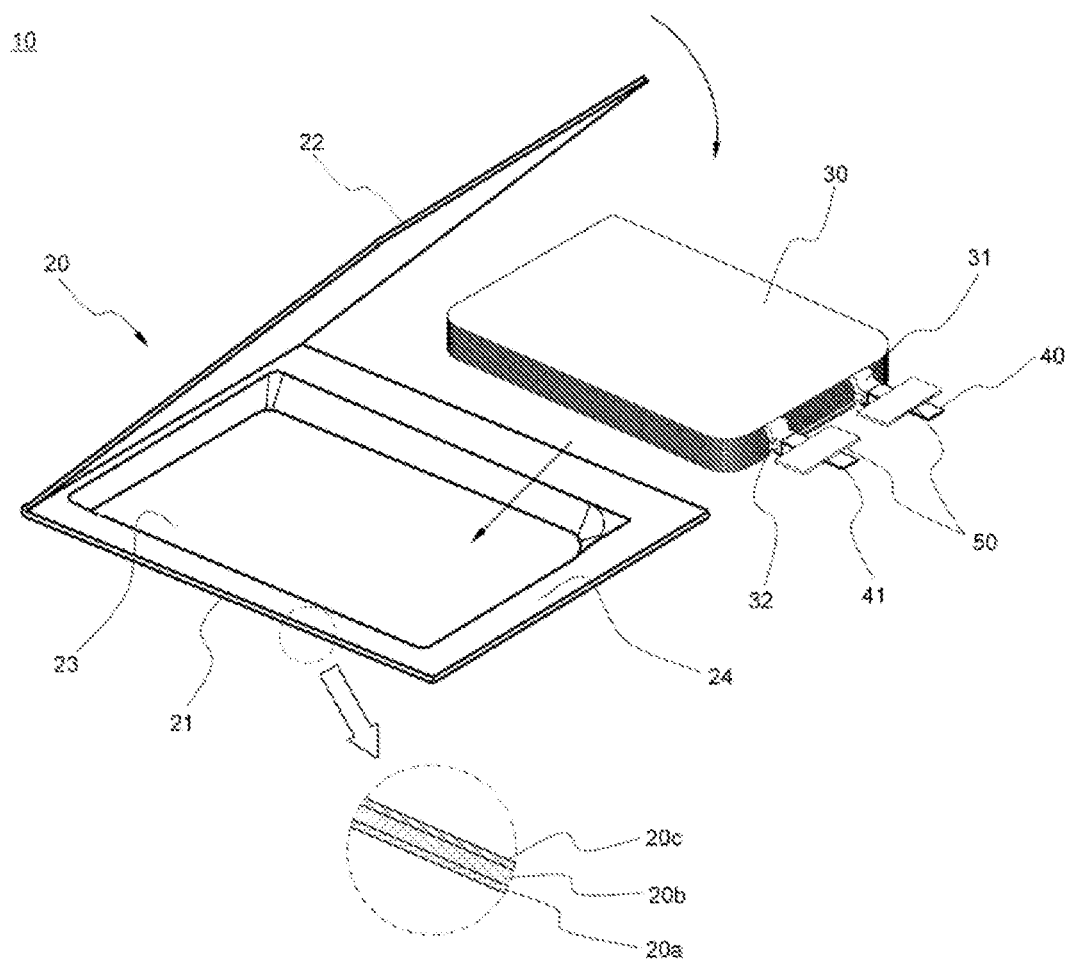

[FIG. 2]
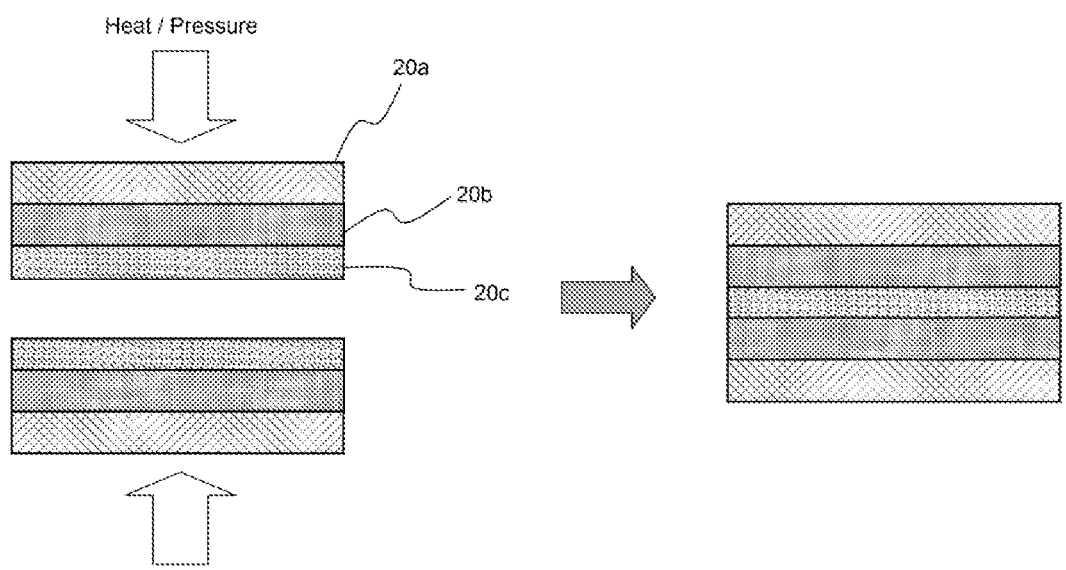

[FIG. 3]
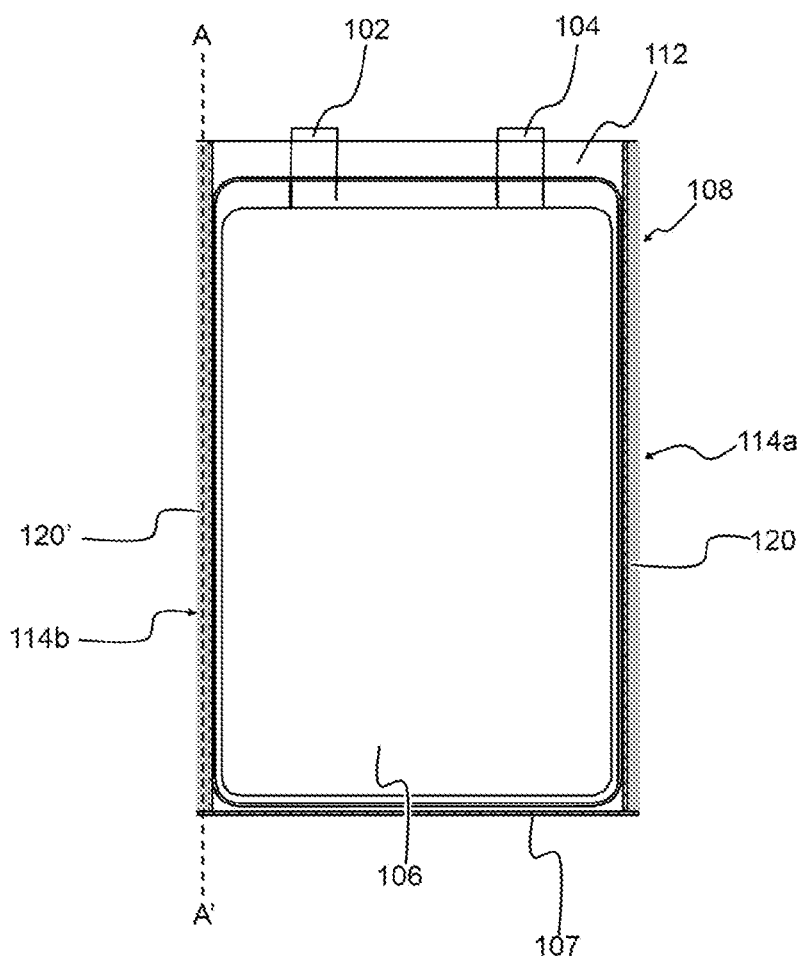

【FIG. 4】
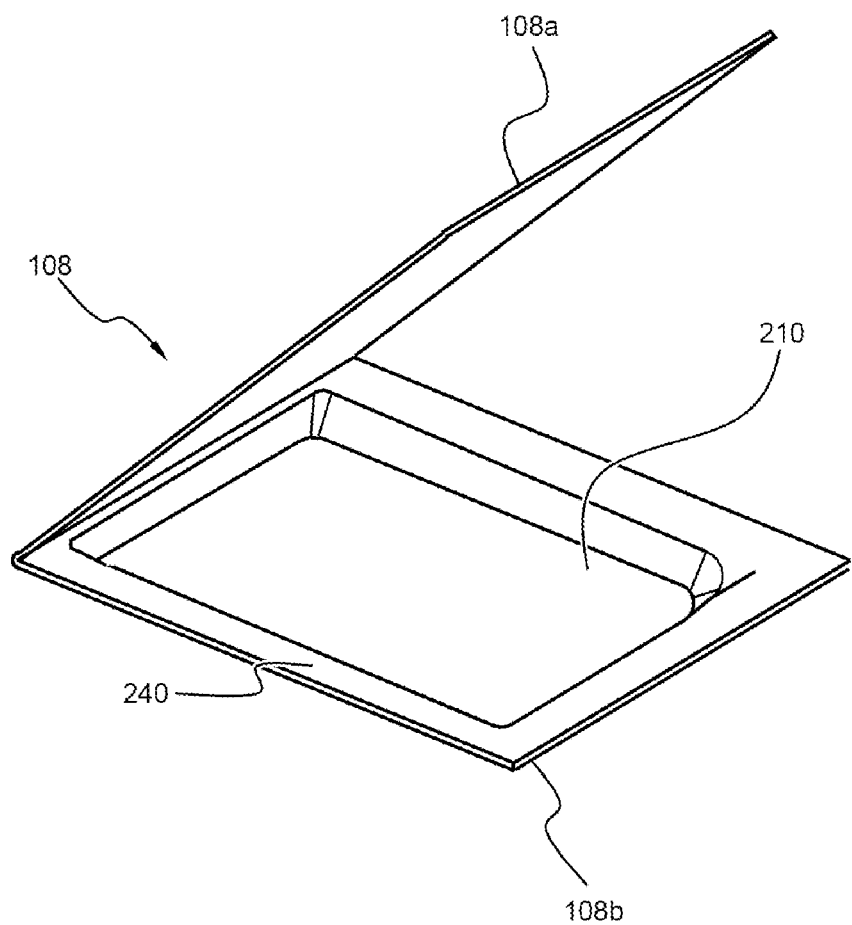

[FIG. 5]
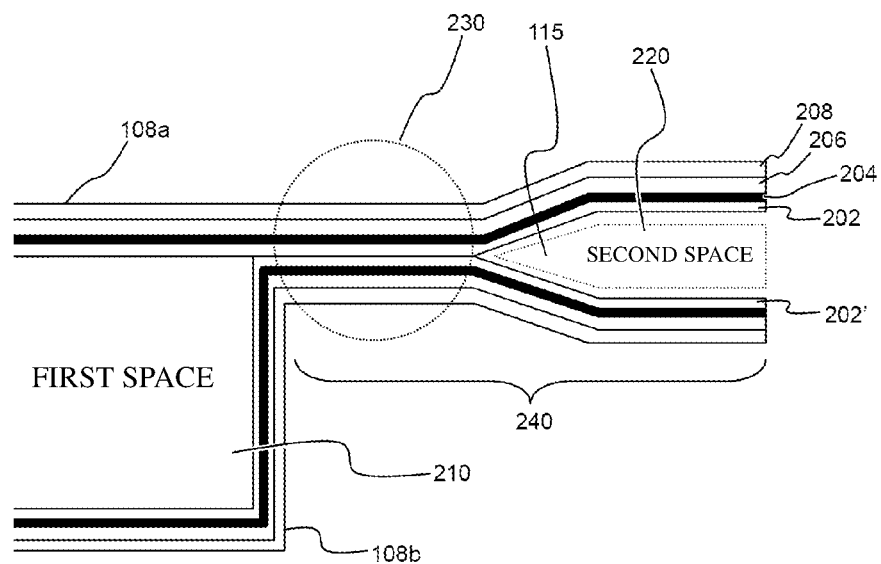
[FIG. 6]
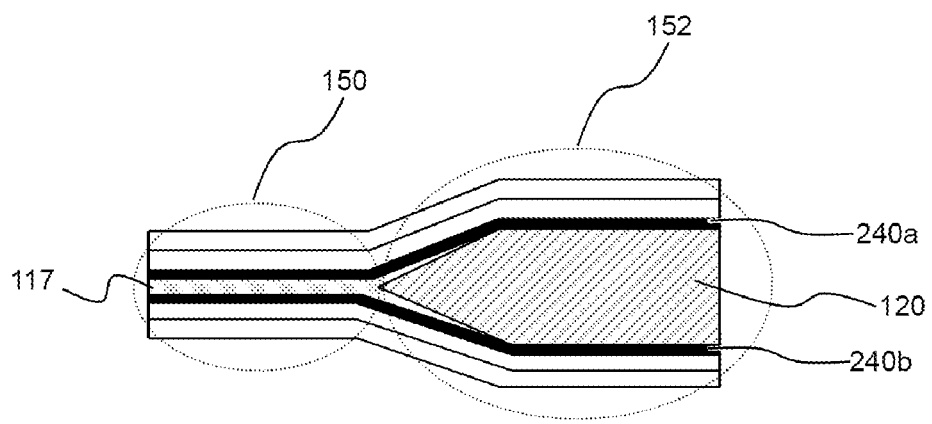

[FIG. 7]
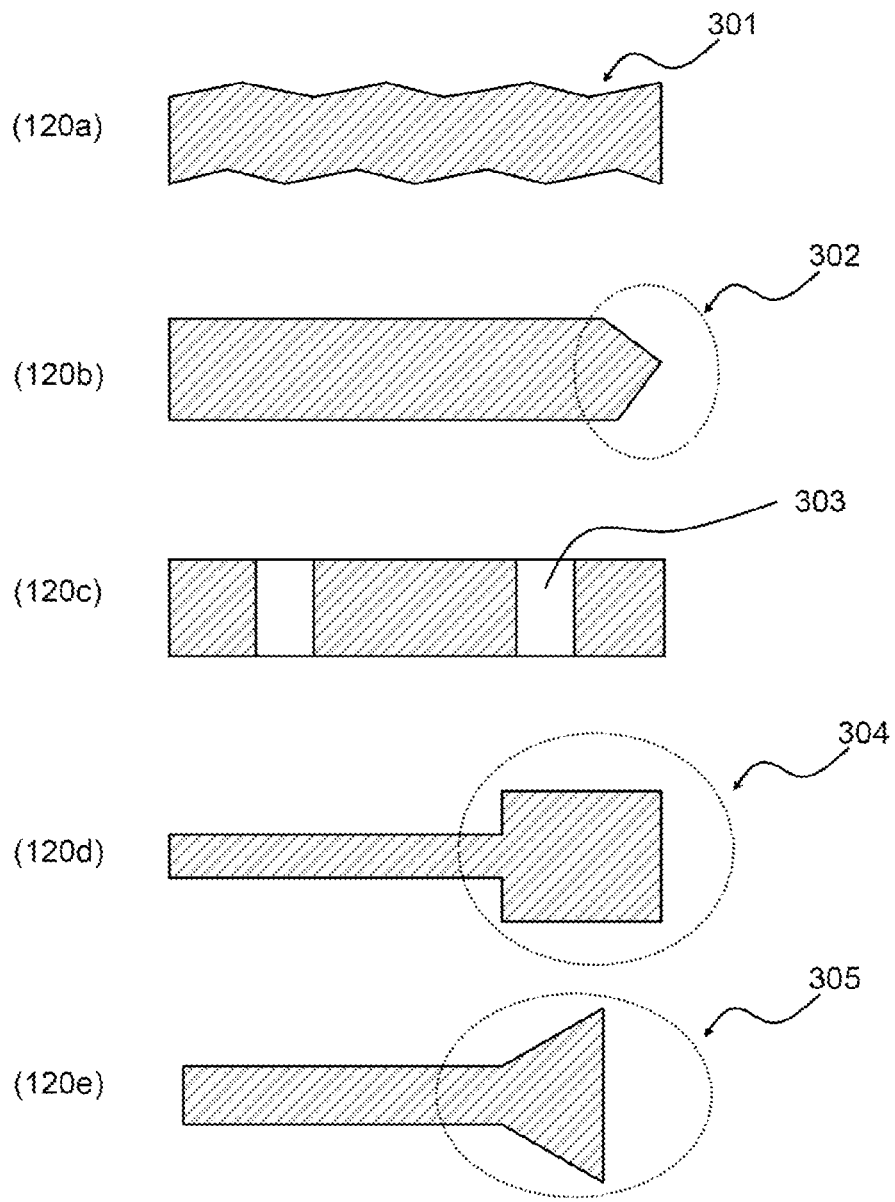

[FIG. 8]
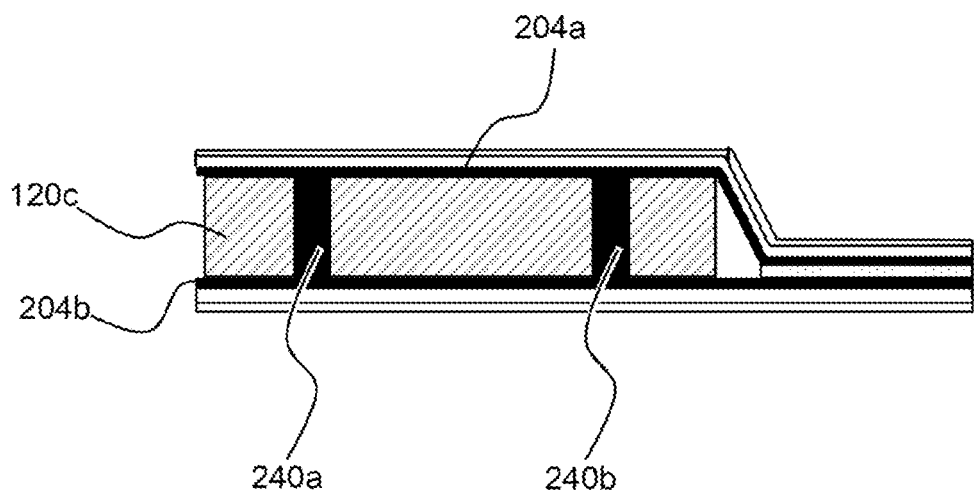

[FIG. 9]
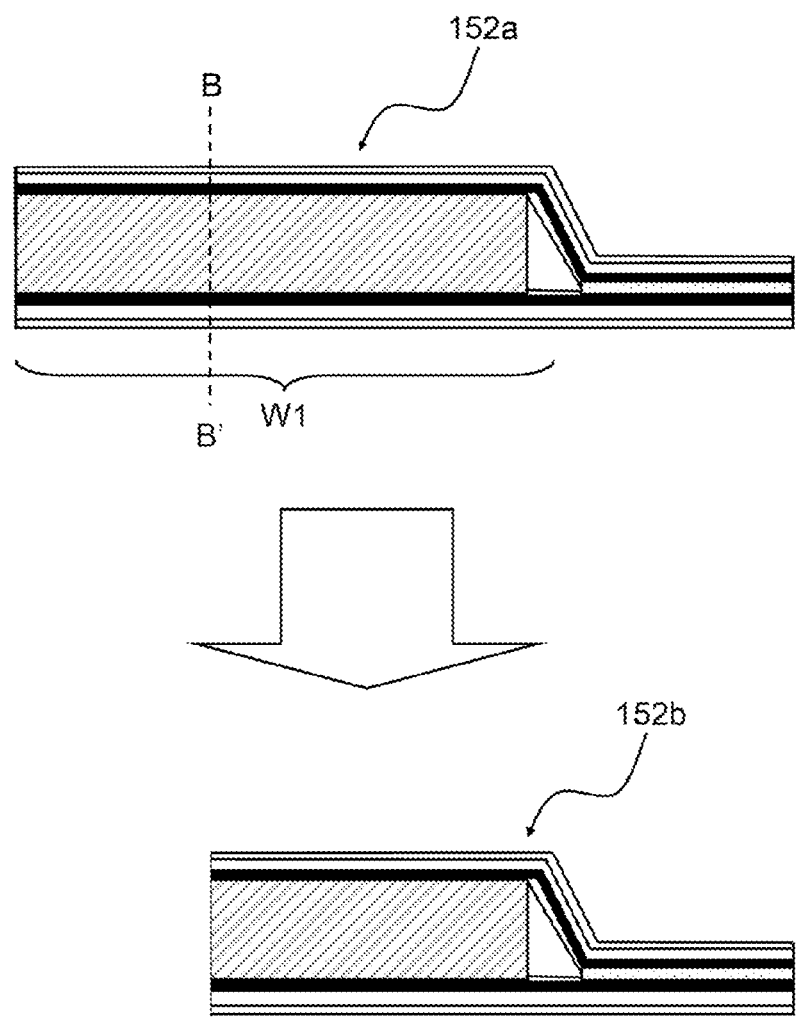

【FIG. 10】
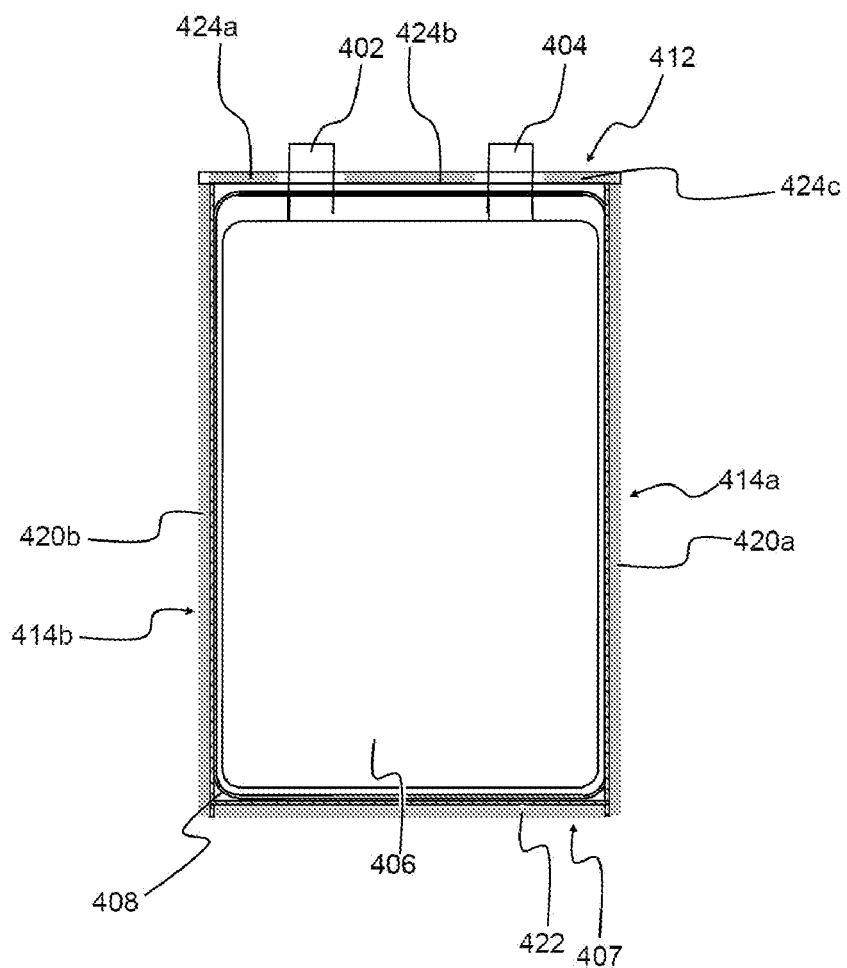

BATTERY CELL HAVING IMPROVED RELIABILITY OF PREVENTING HUMIDITY PENETRATION

CROSS-REFERENCE TO RELATED APPLICATIONS

The present application is a national phase entry under 35 U.S.C. § 371 of International Application No. PCT/KR2016/007869 filed on Jul. 20, 2016, which claims priority from Korean Patent Application No. 10-2015-0113632 filed on Aug. 12, 2015 with the Korean Intellectual Property Office, the disclosures of which are incorporated herein by reference.

TECHNICAL FIELD

The present invention relates to a battery cell having improved reliability of preventing humidity penetration.

BACKGROUND

As mobile devices have been continually developed, and the demand for such mobile devices has increased, the demand for secondary batteries as an energy source for such mobile devices has sharply increased. Among such secondary batteries is a lithium secondary battery having high energy density and high discharge voltage, into which much research has been carried out and which is now commercialized.

Based on the appearance thereof, lithium secondary batteries may be generally classified into a cylindrical battery cell, a prismatic battery cell, and a pouch-shaped battery cell. Based on the type of an electrolyte, lithium secondary batteries may also be classified into a lithium ion battery, a lithium ion polymer battery, and a lithium polymer battery.

The recent trend toward the miniaturization of mobile devices has increased the demand for a prismatic battery or a pouch-shaped battery, which has a small thickness. In particular, much interest is currently focused on a pouch-shaped battery cell because it is easy to modify the shape of the pouch-shaped battery, the cost of manufacturing the pouch-shaped battery is low, and the pouch-shaped battery is lightweight.

In general, a pouch-shaped battery cell is a battery having an electrode assembly and an electrolyte contained in a pouch-shaped battery case, made of a laminate sheet including a resin layer and a metal layer, in a sealed state. The electrode assembly, which is mounted in the battery case, may be configured to have a jelly-roll (wound) type structure, a stacked type structure, or a combination (stacked/folded) type structure.

FIG. 1 is a view typically showing the structure of a battery cell including a stacked type electrode assembly.

Referring to FIG. 1, a battery cell 10 is configured to have a structure in which an electrode assembly 30, including positive electrodes, negative electrodes, and separators disposed respectively between the positive electrodes and the negative electrodes, each of the separators being coated with a solid electrolyte, is mounted in a pouch-shaped battery case 20 in a sealed state such that two electrode leads 40 and 41 electrically connected to positive electrode and negative electrode tabs 31 and 32 of the electrode assembly 30 are exposed outward.

The battery case 20 includes a case body 21 having a depressed receiving part 23, in which the electrode assembly 30 is located, and a cover 22 integrally connected to the case body 21.

The battery case 20 is made of a laminate sheet, which includes an outer resin layer 20a constituting the outermost layer of the laminate sheet, a metal barrier layer 20b for preventing the penetration of materials, and an inner resin layer 20c for sealing.

The positive electrode tabs 31 and the negative electrode tabs 32 of the stacked type electrode assembly 30 are respectively coupled to the electrode leads 40 and 41 by welding. In addition, insulative films 50 may be attached to the top and bottom of each of the electrode leads 40 and 41 in order to prevent the occurrence of a short circuit between a thermal bonding device (not shown) and the electrode leads 40 and 41 and to secure a seal between the electrode leads 40 and 41 and the battery case 20 when the upper end 24 of the case body 21 and the upper end of the cover 22 are thermally bonded to each other using the thermal bonding device.

FIG. 2 typically shows a process of forming a sealed portion of the laminate sheet of FIG. 1 and the coupled section of the laminate sheet.

Referring to FIG. 2 together with FIG. 1, the laminate sheet includes an outer resin layer 20a constituting the outermost layer of the laminate sheet, a metal barrier layer 20b for preventing the penetration of materials, and an inner resin layer 20c for sealing.

The outer resin layer 20a functions to protect the battery cell from the outside. For this reason, it is required for the outer resin layer 20a to exhibit high tensile strength and weather resistance in consideration of the thickness thereof. The outer resin layer 20a is generally made of oriented nylon (ONy). The metal barrier layer 20b functions to prevent air or humidity from being introduced into the battery cell. The metal barrier layer 20b is generally made of aluminum (Al). The inner resin layer 20c of the case body 21 and the inner resin layer 20c of the cover 22 are thermally bonded to each other by the application of heat and pressure thereto in the state in which the electrode assembly is mounted between the case body 21 and the cover 22 in order to seal the battery cell. The inner resin layer 20c is generally made of cast polypropylene (CPP).

In the battery case having the multi-layered laminate structure described above, the inner resin layer 20c of the case body 21 and the inner resin layer 20c of the cover 22 face each other. The inner resin layer 20c of the case body 21 and the inner resin layer 20c of the cover 22 are coupled to each other by thermal bonding. As a result, the end of the coupled inner resin layer 20c is exposed outward. Humidity may easily penetrate into the inner resin layer 20c, which is generally is made of a polymer resin. In addition, an electrolyte may leak from the battery case through the end of the coupled inner resin layer 20c. While the battery cell is used for a long period of time, therefore, the lifespan and stability of the battery cell may be reduced.

Therefore, there is a high necessity for technology that is capable of preventing the penetration of humidity and the leakage of an electrolyte, thereby securing the lifespan and stability of a battery cell.

DISCLOSURE

Technical Problem

The present invention has been made to solve the above problems and other technical problems that have yet to be resolved.

Specifically, it is an object of the present invention to provide a battery cell configured to have a structure in which a metal piece for preventing the penetration of humidity into the battery cell is mounted in a sealed portion of the battery cell, thereby improving the reliability of prevention of humidity penetration.

Technical Solution

In accordance with one aspect of the present invention, the above and other objects can be accomplished by the provision of a plate-shaped battery cell configured to have a structure in which an electrode assembly is received in a battery case made of a laminate sheet including a resin layer and a metal layer together with an electrolyte in the state in which outer edges of the battery case are sealed, wherein the battery case includes thermally bondable portions thermally bonded to each other to constitute a first sealed portion of the battery cell, a first space for receiving the electrode assembly, and second spaces defined outside the thermally bondable portions, the second spaces constituting the outer edges of the battery case together with the thermally bondable portions, and wherein a metal piece for preventing the penetration of humidity into the first space from an outside is mounted in at least one of the second spaces.

In the battery cell according to the present invention, as described above, the metal piece for preventing the penetration of humidity into the battery cell is mounted in at least one of the second spaces, which are defined outside the first sealed portion, through which humidity easily penetrates into the battery cell, in order to improve the humidity resistance and durability of the battery cell.

The first sealed portion of the battery case made of the laminate sheet is generally formed by coupling inner resin layers to each other via thermal bonding. Each of the inner resin layers is made of a polymer resin. For this reason, humidity particles may penetrate into the battery cell, or the electrolyte may leak from the battery cell, through spaces defined between polymer fibers constituting the polymer resin. If humidity penetrates into the battery cell, the electrode assembly may be short-circuited due to the humidity. On the other hand, if the electrolyte leaks from the battery cell, the performance of the battery cell may be lowered over time.

According to the present invention, the metal piece prevents humidity from penetrating into the battery cell, specifically the first space, in which the electrode assembly is mounted. In addition, even in the case in which the electrolyte in the first space penetrates into the first sealed portion, the metal piece, which is located between the first sealed portion and the outside, may prevent the electrolyte from leaking to the outside.

In addition, the metal piece may reinforce the outer edges of the laminate sheet, which has relatively low rigidity, whereby the strength of the battery case may be increased.

In a concrete example, the metal piece may be coupled to the metal layer of the battery case by welding in the at least one of the second spaces to constitute a second sealed portion for preventing the penetration of humidity into the first sealed portion.

The second sealed portion may be configured to have a structure in which the metal piece and the metal layer in the at least one of the second spaces constitute a wall for preventing humidity from being introduced into the first sealed portion and preventing the electrolyte from leaking from the first space to the outside through the first sealed portion.

The battery case may be a pouch-shaped battery case configured to have a structure in which a polypropylene layer, an aluminum layer, and one or more selected from among a nylon layer and a polyethylene terephthalate layer are sequentially stacked from the inside of the battery case toward the outside of the battery case, and the metal piece may be welded to the aluminum layer of the battery case in the at least one of the second spaces.

The thermally bondable portions of the battery case may be formed by placing the inner resin layers, i.e. the polypropylene layers, such that the inner resin layers face each other in the state in which the inner resin layers are in tight contact with each other. The polypropylene layers may be bonded and joined to each other by heat to form the first sealed portion.

Alternatively, when the aluminum layer of the battery case is exposed in the at least one of the second spaces as the result of the polypropylene layer in the at least one of the second spaces being melted by welding, the aluminum layer of the battery case may be joined to the metal piece in the state in which the aluminum layer of the battery case is in tight contact with the metal piece.

As a result, the inner resin layers, i.e. the polypropylene layers, may be bonded to each other, and the metal piece may be joined to the aluminum layer in the at least one of the second spaces, thereby preventing the penetration of humidity into the battery cell from the outermost side of the battery cell.

Metal pieces may be mounted only in the other second spaces, excluding one second space in which the electrode terminals are located. In the second spaces in which no metal pieces are mounted, the polypropylene layers may be joined to each other in the same manner as the thermally bondable portions.

According to circumstances, metal pieces may be mounted in parts of one second space in which the electrode terminals are located such that the metal pieces do not contact the electrode terminals, and may be mounted in all of the other second spaces.

If the thickness of the metal piece is too small, it is difficult to prevent the penetration of a substance and to improve the strength of the metal piece. On the other hand, if the thickness of the metal piece is too large, it is difficult to manufacture the metal piece, the thickness of the sheet is increased. In addition, the metal piece may apply excessive tensile force to the sealed portion in the state in which the metal piece is mounted in the at least one of the second spaces, with the result that the thermally bonded parts of the sealed portion may be separated from each other. Specifically, the metal piece may have a thickness of 0.01 mm to 5 mm. More specifically, the metal piece may have a thickness of 0.1 mm to 3 mm.

The metal piece may be a plate having a length equivalent to 50% to 100% of the length of each of the thermally bondable portions. Specifically, the metal piece may have a length equivalent to 100% of the length of each of the thermally bondable portions. That is, the metal piece may be mounted in the at least one of the second spaces in the longitudinal direction of the thermally bondable portions in order to prevent the penetration of humidity into the first sealed portion.

The material constituting the metal piece may function to prevent penetration or leakage of foreign matter, such as gas or humidity, and to improve the strength of the battery case. The material constituting the metal piece is not particularly restricted so long as the metal piece is made of a metal material that can be welded to aluminum. For example, the metal piece may be made of one or more materials selected from among aluminum, copper, lead, and tin.

In addition, the metal piece may be configured to have a structure that is capable of effectively preventing humidity penetration while exhibiting high reliability of welding to the aluminum layer.

In one example, the outer surface of the metal piece may be configured to have an irregular structure in vertical section in order to increase joining force between the outer surface of the metal piece and the aluminum layer of the battery case while securing a large welding area on the outer surface of the metal piece with respect to the aluminum layer.

In the case in which the melted aluminum layer is joined to the metal piece having the irregular structure, the size of the welded and joined area between the aluminum layer and the metal piece may be increased. In addition, the amount of the metal piece that is melted is larger when an irregular surface contacts the aluminum layer, rather than a flat surface, thereby improving joining reliability.

In another example, the metal piece may have one or more through holes formed therein such that at least a portion of the aluminum layer melted at the time of welding is joined to the metal piece in the through holes.

In general, the battery case made of the laminate sheet may be configured to have a structure in which an electrode assembly receiving part and a cover for covering the electrode assembly receiving part are thermally bonded in the state in which the electrode assembly receiving part and the cover are in tight contact with each other. In each of the second spaces, the aluminum layer of the cover and the aluminum layer of the electrode assembly receiving part may be in tight contact with the top surface and the bottom surface of the metal piece, respectively.

In the above structure, therefore, parts of the aluminum layers disposed in tight contact with the top surface and the bottom surface of the metal piece may be melted during welding, and the melted parts of the aluminum layers may be joined to each other in the through holes. As a result, the metal piece may be joined to the aluminum layers in the through holes as well as on the top surface and the bottom surface of the metal piece, whereby welding reliability and joining strength are improved.

A portion of the metal piece may be provided with a structure or may be deformed in order to prevent a space from being formed between the thermally bondable portions and the metal piece, for example, in order to prevent a space from being formed between the thermally bondable portions and one end of the metal piece due to non-contact between the laminate sheet and the end of the metal piece.

Specifically, at least a portion of the metal piece may be configured to have a tapered structure in which the thickness of at least a portion of the metal piece is gradually decreased toward the thermally bondable portions, and the at least a portion of the metal piece may be one end of the metal piece that faces the thermally bondable portions.

In this structure, the tapered end of the metal piece may be inserted into the portion extending into the at least one of the second spaces from the thermally bondable portions (or the first sealed portion). The inserted end may be joined to the aluminum layers of the laminate sheet in the state in which the end is in tight contact with the aluminum layers. Consequently, no space may be formed between the thermally bondable portions (or the first sealed portion) and the end of the metal piece. In addition, the contact area between the aluminum layers and the metal piece may be increased.

In another example, the metal piece may be configured to have a structure in which the end of the metal piece that faces the thermally bondable portions and the top surface and the bottom surface of the metal piece adjacent to the end of the metal piece protrude outward.

In this structure, the amount of the metal piece that is melted at the end thereof due to the protruding end of the metal piece may be increased at the time of welding. The metal piece may be joined to the aluminum layers while the melted end of the metal piece fills a region extending into the at least one of the second spaces from the thermally bondable portions (or the first sealed portion). Consequently, no space may be formed between the thermally bondable portions (or the first sealed portion) and the end of the metal piece. In addition, the size of the joined area between the metal piece and the aluminum layers may be increased.

According to circumstances, an insulative polymer film may be further applied to the outer surface of the metal piece. In this structure, one end of the insulative polymer film may be further applied to the second sealed portion of the battery case.

That is, the insulative polymer film may prevent the metal piece and the second sealed portion from being exposed to the outside, thereby preventing the occurrence of an unexpected situation during the assembly or use of the battery cell, for example, contact between the metal piece and an external conductor due to the partial removal of the second sealed portion and the corrosion of the metal piece.

The material constituting the insulative polymer film is not particularly restricted so long as the insulative polymer film is made of an electrically insulative material exhibiting high insulation to a metal foil. For example, the insulative polymer film may include, as a barrier layer, a material selected from among polyethylene (PE), polypropylene (PP), polyethylene terephthalate (PET), oriented or non-oriented nylon, polytetrafluoroethylene (PTFE), and ethylene vinyl alcohol (EVOH).

In general, polyolefin resin, such as polypropylene, exhibits low adhesion to metal. In order to increase the adhesive force with respect to the metal barrier layer, therefore, the insulative polymer film may be attached to the metal foil by thermal bonding or using an adhesive. Consequently, the adhesive force may be increased, and the blocking characteristics may be improved.

In the present invention, the welding method is not particularly restricted, so long as welding can be performed with respect to the metal. For example, the aluminum layers may be welded to the metal piece by ultrasonic bonding or seam welding.

In addition, the welding may be performed using an ultrasonic bonder or an ultra seam welder.

In the ultrasonic bonder or the ultra seam welder, the aluminum layers may be welded to the metal piece using a welding horn having a size corresponding to the width of each of the second spaces or a size corresponding to the sum of the width of each of the thermally bondable portions and the width of each of the second spaces. In addition, in the ultra seam welder, a roller type welding horn capable of continuously performing the process may be used.

Meanwhile, in a concrete example, the battery case may include a case body defining the first space and a cover extending from one end of the case body or provided separately from the case body, and the case body may include bondable surfaces extending outward from respective ends of the first space, the bondable surfaces facing the cover to define the thermally bondable portions and the second spaces.

The thermally bondable portions may be bonded so as to have a width equivalent to 20% to 40% of the width of each of the bondable surfaces, thereby constituting the first sealed portion, and each of the second spaces may be welded to the metal piece so as to have a width equivalent to 60% to 80% of the width of each of the bondable surfaces, thereby constituting the second sealed portion.

If the width of each of the thermally bondable portions is greater than the upper limit of the above range, i.e. if the width of each of the thermally bondable portions is too large, it is not easy to mount and weld the metal piece, which is undesirable. On the other hand, if the width of each of the thermally bondable portions is less than the lower limit of the above range, i.e. if the width of each of the thermally bondable portions is too small, it is not easy to perform the thermal bonding process. Even though the thermal bonding process is performed, the bonded area is small, with the result that the reliability with which the first sealed portion is sealed cannot be secured.

In addition, it is advantageous for the second sealed portion to have a large width during welding and/or immediately after welding in order to improve the reliability of welding with respect to the metal piece in the at least one of the second space. As described above, the second sealed portion may have a larger width than the thermally bondable portions (or the first sealed portion).

According to circumstances, the second sealed portion may be cut by 50 to 90% of the width thereof in the longitudinal direction in the state in which the second sealed portion is welded to the metal piece. In this case, the area of the battery cell occupied by the outer edge (i.e. the outer sealed portion) may be minimized. Consequently, it is possible to configure the battery cell such that the battery cell has a more compact size.

In general, the outer sealed portion of a pouch-shaped battery cell may be formed so as to have a length equivalent to 10% to 20% of the width and/or the length of the battery cell in order to secure the reliability of sealing. However, the pouch-shaped battery cell has a disadvantage in that the size of an electrode assembly received in a battery case is reduced by the length of the outer sealed portion of the battery cell in order to correspond to the dimensions of an electric device in which the battery cell is to be mounted.

In the battery cell according to the present invention, the second sealed portion, to which the metal piece is welded, is further formed. Consequently, the width of the first sealed portion, which is sealed by thermal bonding, may be set to be much less than that of a general pouch-shaped battery cell. For example, the width of the first sealed portion may be 3% to 5% of the width or the length of the battery cell.

In addition, in the case in which the second sealed portion is cut as described above, the area or width of the battery cell occupied by the outer sealed portion is minimized. Consequently, it is possible to configure the battery cell according to the present invention such that the battery cell according to the present invention has a more compact size than a general pouch-shaped battery cell. Furthermore, the size of the electrode assembly may be increased by the length of the conventional second sealed portion, whereby it is possible to increase the power storage capacity and output of the battery cell compared with other battery cells having the same external dimensions.

In accordance with another aspect of the present invention, there is provided a method of manufacturing the battery cell with the above-stated construction.

In a concrete example, the method may include (a) receiving an electrode assembly in a first space together with an electrolyte and placing a cover and a case body such that the cover and the case body face each other to form thermally bondable portions and second spaces, (b) thermally bonding the thermally bondable portions to form a first sealed portion, (c) inserting a metal piece into each of the second spaces, (d) welding the metal piece to a battery case in each of the second spaces using a welder to form a second sealed portion, and (e) cutting the second sealed portion along the longitudinal direction thereof such that part of the second sealed portion equivalent to 30% to 90% of the width of the second sealed portion is removed.

This method is characterized in that the metal piece is mounted and welded in each of the second spaces after the thermally bondable portions are thermally bonded. Welding may be performed in the state in which the overall shape of the battery case is formed by thermal bonding. Consequently, it is possible to more stably perform the welding process. In addition, it is possible to greatly improve the dimensional stability of the battery cell. For example, the battery cell may have a desired width and length.

In addition, at step (c), the metal pieces may be mounted only in the other second spaces, excluding one second space in which electrode terminals are located. According to circumstances, the metal pieces may also be mounted in parts of one of the second spaces in which the electrode terminals are located such that the metal pieces do not contact the electrode terminals.

At step (e), the second sealed portion may be cut such that part of the second sealed portion equivalent to 50% to 90% of the width of the second sealed portion is removed in order to manufacture a compact battery cell.

In another concrete example, the method may include (a) receiving an electrode assembly in a first space together with an electrolyte and placing a cover and a case body such that the cover and the case body face each other to form thermally bondable portions and second spaces, (b) mounting a metal piece in each of the second spaces adjacent to the thermally bondable portions, (c) welding the metal piece to a battery case in each of the second spaces using a welder and thermally bonding the thermally bondable portions using heat generated during welding to form a first sealed portion and a second sealed portion, and (d) cutting the second sealed portion along the longitudinal direction thereof such that part of the second sealed portion equivalent to 30% to 90% of the width of the second sealed portion is removed.

This method is characterized in that welding of the metal piece and thermal bonding of the thermally bondable portions are performed simultaneously. Consequently, the battery cell may be rapidly manufactured, thereby achieving mass production of the battery cell.

At step (d), the second sealed portion may be cut such that part of the second sealed portion equivalent to 50% to 90% of the width of the second sealed portion is removed in order to manufacture a compact battery cell.

In the battery cell according to the present invention and the method of manufacturing the battery cell, as described above, the metal pieces may be mounted in the battery case, thereby effectively preventing the penetration of humidity and the leakage of an electrolyte.

Meanwhile, the kind of the battery cell according to the present invention is not particularly restricted. In a concrete example, the battery cell may be a lithium secondary battery, such as a lithium ion (Li-ion) battery, a lithium polymer (Li-polymer) battery, or a lithium ion polymer (Li-ion polymer) battery, which exhibit high energy density, discharge voltage, and output stability.

In general, a lithium secondary battery includes a positive electrode, a negative electrode, a separator, and a non-aqueous electrolyte containing lithium salt.

The positive electrode may be manufactured, for example, by applying a mixture of a positive electrode active material, a conductive agent, and a binder to a positive electrode current collector and/or a positive electrode current collecting extension and drying the mixture. A filler may be further added to the mixture as needed.

In general, the positive electrode current collector and/or the positive electrode current collecting extension has a thickness of 3 to 500 μm. The positive electrode current collector and/or the positive electrode current collecting extension is not particularly restricted so long as the positive electrode current collector and/or the positive electrode current collecting extension exhibits high conductivity while the positive electrode current collector and/or the positive electrode current collecting extension does not induce any chemical change in a battery to which the positive electrode current collector and/or the positive electrode current collecting extension is applied. For example, the positive electrode current collector and/or the positive electrode current collecting extension may be made of stainless steel, aluminum, nickel, titanium, or plastic carbon. Alternatively, the positive electrode current collector and/or the positive electrode current collecting extension may be made of aluminum or stainless steel, the surface of which is treated with carbon, nickel, titanium, or silver. In addition, the positive electrode current collector and/or the positive electrode current collecting extension may have a micro-scale uneven pattern formed at the surface thereof so as to increase the adhesive force of the positive electrode active material. The positive electrode current collector and/or the positive electrode current collecting extension may be configured in various forms, such as a film, a sheet, a foil, a net, a porous body, a foam body, and a non-woven fabric body.

The positive electrode active material may be, but is not limited to, a layered compound, such as a lithium cobalt oxide ($LiCoO_2$) or a lithium nickel oxide ($LiNiO_2$), or a compound replaced by one or more transition metals; a lithium manganese oxide represented by a chemical formula $Li_{1+x}Mn_{2-x}O_4$ (where x=0 to 0.33) or a lithium manganese oxide, such as $LiMnO_3$, $LiMn_2O_3$, or $LiMnO_2$; a lithium copper oxide ($Li_2CuO_2$); a vanadium oxide, such as $LiV_3O_8$, $LiFe_3O_4$, $V_2O_5$, or $Cu_2V_2O_7$; an Ni-sited lithium nickel oxide represented by a chemical formula $LiNi_{1-x}M_xO_2$ (where M=Co, Mn, Al, Cu, Fe, Mg, B, or Ga, and x=0.01 to 0.3); a lithium manganese composite oxide represented by a chemical formula $LiMn_{2-x}M_xO_2$ (where M=Co, Ni, Fe, Cr, Zn, or Ta, and x=0.01 to 0.1) or a chemical formula $Li_2Mn_3MO_8$ (where M=Fe, Co, Ni, Cu, or Zn); $LiMn_2O_4$ having Li of a chemical formula partially replaced by alkaline earth metal ions; a disulfide compound; or $Fe_2(MoO_4)_3$.

The conductive agent is generally added so that the conductive agent has 1 to 30 weight % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, or summer black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or conductive materials, such as polyphenylene derivatives may be used as the conductive agent.

The binder is a component assisting in binding between the active material and the conductive agent and in binding with the current collector. The binder is generally added in an amount of 1 to 30 weight % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as it does not cause chemical changes in a battery to which the filler is applied and is made of a fibrous material. As examples of the filler, there may be used olefin polymers, such as polyethylene and polypropylene; and fibrous materials, such as glass fiber and carbon fiber.

The negative electrode may be manufactured by applying and drying a negative electrode active material to a negative electrode current collector and/or negative electrode current collecting extension. The above-described components may be selectively added to the negative electrode active material as needed.

In general, the negative electrode current collector and/or the negative electrode current collecting extension has a thickness of 3 to 500 μm. The negative electrode current collector and/or the negative electrode current collecting extension is not particularly restricted so long as the negative electrode current collector and/or the negative electrode current collecting extension exhibits high conductivity while the negative electrode current collector and/or the negative electrode current collecting extension does not induce any chemical change in a battery to which the negative electrode current collector and/or the negative electrode current collecting extension is applied. For example, the negative electrode current collector and/or the negative electrode current collecting extension may be made of copper, stainless steel, aluminum, nickel, titanium, or plastic carbon. Alternatively, the negative electrode current collector and/or the negative electrode current collecting extension may be made of copper or stainless steel, the surface of which is treated with carbon, nickel, titanium, or silver, or an aluminum-cadmium alloy. In addition, the negative electrode current collector and/or the negative electrode current collecting extension may have a micro-scale uneven pattern formed at the surface thereof so as to increase the adhesive force of the negative electrode active material, in the same manner as the positive electrode current collector and/or the positive electrode current collecting extension. The negative electrode current collector and/or the negative electrode current collecting extension may be configured in various forms, such as a film, a sheet, a foil, a net, a porous body, a foam body, and a non-woven fabric body.

As the negative electrode active material, for example, there may be used carbon, such as a non-graphitizing carbon or a graphite-based carbon; a metal composite oxide, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, Group 1, 2 and 3 elements of the periodic table, halogen; $0 \le x \le 1$; $1 \le y \le 3$; $1 \le z \le 8$); lithium metal; lithium alloy; silicon-based alloy; tin-based alloy; metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; conductive polymer, such as polyacetylene; or a Li—Co—Ni based material.

The separator is interposed between the positive electrode and the negative electrode. As the separator, for example, an insulative thin film exhibiting high ion permeability and high mechanical strength may be used. The separator generally has a pore diameter of 0.01 to 10 μm and a thickness of 5 to 300 μm. As the material for the separator, for example, a sheet or non-woven fabric made of olefin polymer, such as polypropylene, which exhibits chemical resistance and hydrophobicity, glass fiber, or polyethylene is used. In the case in which a solid electrolyte, such as polymer, is used as an electrolyte, the solid electrolyte may also function as the separator.

The electrolyte may be a non-aqueous electrolyte containing lithium salt, which is composed of a non-aqueous electrolytic solution and lithium salt. A non-aqueous organic solvent, an organic solid electrolyte, or an inorganic solid electrolyte may be used as the non-aqueous electrolytic solution. However, the present invention is not limited thereto.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the above-mentioned non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. According to circumstances, in order to impart incombustibility, the non-aqueous electrolyte may further include halogen-containing solvents, such as carbon tetrachloride and ethylene trifluoride. Furthermore, in order to improve high-temperature retention characteristics, the non-aqueous electrolyte may further include carbon dioxide gas. Moreover, fluoro-ethylene carbonate (FEC) and propene sultone (PRS) may be further included.

In a preferred example, lithium salt, such as $LiPF_6$, $LiClO_4$, $LiBF_4$, or $LiN(SO_2CF_3)_2$, may be added to a mixed solvent of cyclic carbonate, such as EC or PC, which is a high dielectric solvent, and liner carbonate, such as DEC, DMC, or EMC, which is a low viscosity solvent, to prepare a non-aqueous electrolyte containing lithium salt.

In accordance with other aspects of the present invention, there are provided a battery module including one or more battery cells, a battery pack including one or more battery modules, and a device including the battery pack.

BRIEF DESCRIPTION OF DRAWINGS

The above and other objects, features and other advantages of the present invention will be more clearly understood from the following detailed description taken in conjunction with the accompanying drawings, in which:

FIG. 1 is an exploded perspective view showing a conventional pouch-shaped battery made of a laminate sheet;

FIG. 2 is a sectional view typically showing a process of forming a sealed portion of the laminate sheet of FIG. 1;

FIG. 3 is a typical view showing a battery cell according to an embodiment of the present invention;

FIGS. 4 and 5 are typical views showing a battery case according to the present invention;

FIG. 6 is a typical view showing the structure in which a metal piece is mounted in a second space defined in the battery case;

FIG. 7 is a typical view showing various kinds of metal pieces;

FIG. 8 is a typical view showing the structure in which a metal piece having through holes formed therein, shown in FIG. 7, is mounted in the second space;

FIG. 9 is a typical view showing processing of a second sealed portion; and

FIG. 10 is a typical view showing a battery cell according to another embodiment of the present invention.

DETAILED DESCRIPTION OF THE EMBODIMENT

Now, exemplary embodiments of the present invention will be described in detail with reference to the accompanying drawings. It should be noted, however, that the scope of the present invention is not limited by the illustrated embodiments.

FIG. 3 is a view typically showing a battery cell according to an embodiment of the present invention.

Referring to FIG. 3, a battery cell 100 is configured to have a plate-shaped structure in which an electrode assembly 106 is received in a battery case 108 made of a laminate sheet including a resin layer and a metal layer together with an electrolyte in the state in which outer edges 112, 114a, 114b, and 107 of the battery case 108 are sealed.

The outer edges 112, 114a, 114b, and 107 include a front outer edge 112, from which electrode terminals 102 and 104 of the electrode assembly 106 protrude, side outer edges 114a and 114b extending from the front outer edge 112, the side outer edges 114a and 114b being configured to define sides of the battery cell 100, and a rear outer edge 107 extending between the side outer edges 114a and 114b, the rear outer edge 107 being configured to define the rear of the battery cell 100.

Metal pieces 120 and 120' are mounted in the side outer edges 114a and 114b. Each of the metal pieces 120 and 120' is configured to have a plate shape, and has the same length as a corresponding one of the side outer edges 114a and 114b.

Consequently, the battery cell 100 according to the present invention is configured to have a structure in which the penetration of humidity into the battery cell 100 is prevented by the metal pieces 120 and 120', which are mounted in the side outer edges 114a and 114b, respectively.

The metal pieces 120 and 120' are mounted in specific spaces defined in the battery case 106 in order to prevent the penetration of humidity into the battery cell 100. Hereinafter, the metal pieces 120 and 120' will be described in detail with reference to the accompanying drawings.

FIGS. 4 and 5 are typical views showing a battery case according to the present invention, and FIG. 6 is a view typically showing the structure in which a metal piece is mounted in a second space defined in the battery case.

Referring to these figures together with FIG. 3, a battery case 108 includes a case body 108b having a first space 210 defined therein and a cover 108a extending from one end of the case body 108b.

The case body 108b includes bondable surfaces 240 extending outward from the ends of the first space 210.

In the case in which the cover 108a is disposed so as to face the bondable surfaces 240, thermally bondable portions 230 are formed. A second space 220 is defined outside the thermally bondable portions 230.

The battery case 108 includes a polypropylene layer 202, an aluminum layer 204, an oriented nylon layer 206, and a polyethylene terephthalate layer 208. In the thermally bondable portions 230, the above layers are arranged symmetrically in the state in which the polypropylene layer 202 of the cover 108a faces a polypropylene layer 202' of the bondable surfaces 240.

When the thermally bondable portions 230 are thermally bonded, the polypropylene layers 202 and 202', which face each other, are joined to each other to constitute an inner resin layer 117 (see FIG. 6). As shown in FIG. 6, a first sealed portion 150 is formed in each of the side outer edges 114a and 114b of the battery cell 100.

The metal piece 120 is configured to be inserted and mounted in the second space 220 defined in the battery case 108.

The metal piece 120 is coupled to a portion of the battery case 108 by welding in the state of being inserted in the second space 220 to constitute a second sealed portion 152.

As described above, the battery cell 100 according to the present invention is configured to have a structure in which the metal piece 120 for preventing the penetration of liquid is mounted in the second sealed portion 152 in order to prevent the penetration of humidity into the first space 210, in which the electrode assembly 106 is mounted, thereby preventing the occurrence of problems related to humidity. In addition, even when an electrolyte in the first space 210 is transmitted through the inner resin layer 117 of the first sealed portion 150, the metal piece 120, mounted in the second sealed portion 152, blocks the leakage of the electrolyte to the outside, thereby preventing the leakage of the electrolyte, which may occur in the battery cell 100 including the laminate sheet.

In the battery case 108, the polypropylene layer 202 in the second space 220 is melted when welding is performed outside the second space 220, with the result that the aluminum layers 204a and 204b are exposed in the second space 220. Consequently, the aluminum layers 204a and 204b are bonded and joined to the metal piece 120 in the state in which the aluminum layers 204a and 204b are in tight contact with the metal piece 120.

The metal piece 120 may have various structures in order to effectively prevent humidity penetration in the state in which the reliability of welding between the aluminum layer 204a and the metal piece 120 and between the aluminum layer 204b and the metal piece 120 is improved.

Referring to FIG. 7, a metal piece 120a may have an irregular structure 301 when viewed in vertical section.

In the case in which the melted aluminum layers 204a and 204b are joined to the metal piece 120a having the irregular structure 301, the welded and joined areas between the aluminum layer 204a and the metal piece 120a and between the aluminum layer 204b and the metal piece 120a may be increased.

In another example, a metal piece 120b may have a tapered structure in which the thickness of one end of the metal piece 120b is gradually decreased as indicated by reference numeral 302.

In this structure, the tapered end 302 of the metal piece 120b may be inserted into the portion 115 (see FIG. 5) extending into the second space 220 from the thermally bondable portions 230 (or the first sealed portion 150). The inserted end 302 may be joined to the aluminum layers 204a and 204b of the laminate sheet in the state in which the end 302 is in tight contact with the aluminum layers 204a and 204b. Consequently, no space may be formed between the thermally bondable portions 230 (or the first sealed portion 150) and the end of the metal piece 120b, and the contact area between the aluminum layer 204a and the metal piece 120b and between the aluminum layer 204b and the metal piece 120b may be increased.

A metal piece 120c may be configured to have a structure in which one or more through holes 303 are formed in the metal piece 120c from the top to the bottom of the metal piece 120c.

In the metal piece 120c having the through holes 303, as shown in FIG. 8, portions of the aluminum layers 204a and 204b that are in tight contact with the top and bottom of the metal piece 120c are melted at the time of welding, and the melted portions are joined to each other in the through holes 303. In addition, the metal piece 120c may be joined to the aluminum layers 204a and 204b in the through holes 303 as well as on the top and the bottom of the metal piece 120c. Consequently, the welding reliability and joining strength of the metal piece 120c are very high.

In other examples, metal pieces 120d and 120e may be configured to have structures in which the top and the bottom of the metal pieces 120d and 120e protrude outward from the ends thereof adjacent to the thermally bondable portions 230 as indicated by reference numerals 304 and 305.

In these structures, the amount of the metal pieces 120d and 120e that is melted at the ends 304 and 305 thereof due to the protruding ends of the metal pieces 120d and 120e may be increased at the time of welding. The metal pieces 120d and 120e may be joined to the aluminum layers 204a and 204b while the melted ends 304 and 305 of the metal pieces 120d and 120e fill the region 115 (see FIG. 5) extending into the second space from the thermally bondable portions 230 (or the first sealed portion 150). Consequently, no space may be formed between the thermally bondable portions 230 (or the first sealed portion 150) and the ends of the metal pieces 120d and 120e, and the size of the joined area between the metal pieces 120d and 120e and the aluminum layers 204a and 204b may be increased.

When the metal piece is mounted and coupled in the second space to constitute the second sealed portion, as described above, a portion of the second sealed portion may be cut, as shown in FIG. 9.

Specifically, referring to FIG. 9, a second sealed portion 152a may be cut along the cutting line B-B' in the longitudinal direction (A-A' of FIG. 3) of the second sealed portion 152a such that part of the second sealed portion 152a equivalent to approximately 30% of the width W1 of the second sealed portion 152a from the outer end of the second sealed portion 152a is removed.

In general, the outer edge (outer sealed portion) of a pouch-shaped battery cell may be formed so as to have a length equivalent to 10% to 20% of the width and/or the length of the battery cell in order to secure the reliability of sealing. However, the pouch-shaped battery cell has a disadvantage in that the size of an electrode assembly received in a battery case is reduced by the length of the outer sealed portion of the battery cell in order to correspond to the dimensions of an electric device in which the battery cell is mounted.

In the battery cell according to the present invention, the second sealed portion, to which the metal piece is welded, is further formed. Consequently, the width of the first sealed portion, which is sealed by thermal bonding, may be set to be much less than that of a general pouch-shaped battery cell. For example, the width of the first sealed portion may be 3% to 5% of the width or the length of the battery cell.

In addition, in the case in which the second sealed portion is cut, as shown in FIG. 9, the area or width of the battery cell occupied by the sealed portion is minimized. Consequently, it is possible to configure the battery cell according to the present invention such that the battery cell according to the present invention has a more compact size than a general pouch-shaped battery cell. Furthermore, the size of the electrode assembly may be increased by the length of the conventional second sealed portion, whereby it is possible to increase the power storage capacity and output of the battery cell compared with other battery cells having the same external dimensions.

In FIG. 9, the cutting line B-B' is shown as being adjacent to the second sealed portion, for the convenience of description. In the case in which the metal piece is securely joined in the second space, however, the second sealed portion may be cut in the state in which the cutting line is set so as to be adjacent to the first sealed portion.

FIG. 10 is a view typically showing a battery cell according to another embodiment of the present invention.

Referring to FIG. 10, a battery cell 400 is configured to have a plate-shaped structure in which an electrode assembly 406 is received in a battery case 408 made of a laminate sheet including a resin layer and a metal layer together with an electrolyte in the state in which outer edges 412, 414a, 414b, and 407 of the battery case 408 are sealed.

The outer edges 412, 414a, 414b, and 407 include a front outer edge 412, from which electrode terminals 402 and 404 of the electrode assembly 406 protrude, side outer edges 414a and 414b extending from the front outer edge 412, the side outer edges 414a and 414b being configured to define sides of the battery cell 400, and a rear outer edge 407 extending between the side outer edges 414a and 414b, the rear outer edge 407 being configured to define the rear of the battery cell 400.

Metal pieces 420a and 420b are mounted in the side outer edges 414a and 414b of battery case 408. Each of the metal pieces 420a and 420b is configured to have a plate shape, and has approximately the same length as a corresponding one of the side outer edges 414a and 414b.

A metal piece 422 is mounted in the rear outer edge 407 of the battery case 408. The metal piece 422 is configured to have a plate shape, and has approximately the same length as the rear outer edge 407.

Three metal pieces 424a, 424b, and 424c are mounted in the front outer edge 412 of the battery case 408 in the state in which the metal pieces 424a, 424b, and 424c are disposed between the electrode terminals 402 and 404 and at the respective outsides of the electrode terminals 402 and 404 such that the metal pieces 424a, 424b, and 424c do not contact the electrode terminals 402 and 404.

In the battery cell 400 according to the present invention, as described above, the metal pieces 420a, 420b, 422, 424a, 424b, and 424c for preventing the penetration of humidity into the battery cell 400 are mounted in the outer edges 412, 414a, 414b, and 407, through which humidity easily penetrates into the battery cell 400, whereby it is possible to prevent the occurrence of problems related to safety and stability due to the penetration of humidity.

In addition, the metal pieces 420a, 420b, 422, 424a, 424b, and 424c reinforce the outer edges of the battery cell. Consequently, it is possible to withstand the deformation of the battery cell due to the application of external force to the battery cell. For example, it is possible to limit a phenomenon in which the battery cell is distorted or twisted.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

As is apparent from the above description, a battery cell according to the present invention is configured to have a structure in which metal pieces for preventing humidity or an electrolyte from being transmitted therethrough are mounted in outer edges of the battery cell such that the humidity does not penetrate into a first space, in which an electrode assembly is mounted, or such that the electrolyte does not leak from the first space to the outside.

In addition, the metal pieces reinforce the outer edges of a laminate sheet, which has relatively low rigidity, whereby the strength of a battery case is increased.

The invention claimed is:

1. A plate-shaped battery cell having an electrode assembly received in a battery case together with an electrolyte in a state in which a periphery of the battery case is sealed, wherein the battery case comprises:
    an upper portion and a lower portion each made of a respective laminate sheet comprising a resin layer and a metal layer thermally bonded to each other at thermally bondable portions of the battery case, the thermally bondable portions defining a first sealed portion of the battery cell;
    a first space defined between the upper and lower portions of the battery case inside the thermally bondable portions for receiving the electrode assembly;
    second spaces defined between the upper and lower portions of the battery case outside the thermally bondable portions, the second spaces extending from the thermally bondable portions to an outer edge of the battery case defined by terminal ends of the upper and lower portions, the second spaces together with the thermally bondable portions constituting the periphery of the battery case; and a metal piece for preventing penetration of humidity into the first space from outside the battery case, the metal piece positioned in at least one of the second spaces and welded to the metal layer of the battery case so as to define a second sealed portion for preventing penetration of humidity into the first sealed portion, wherein the metal piece extends outwardly, away from the thermally bondable portions, to the outer edge of the battery case without extending beyond the outer edge.

2. The battery cell according to claim 1, wherein
the battery case is a pouch-shaped battery case configured to have a structure in which a polypropylene layer, an aluminum layer, and one or more selected from among a nylon layer and a polyethylene terephthalate layer are sequentially stacked from an inside of the battery case toward an outside of the battery case, and
the metal piece is welded to the aluminum layer of the battery case in the at least one of the second spaces.

3. The battery cell according to claim 2, wherein, when the aluminum layer of the battery case is exposed in the at least one of the second spaces as a result of the polypropylene layer in the at least one of the second spaces being melted by welding, the aluminum layer of the battery case is joined to the metal piece in a state in which the aluminum layer of the battery case is in tight contact with the metal piece.

4. The battery cell according to claim 2, wherein an outer surface of the metal piece is configured to have an irregular structure in vertical section in order to increase joining force between the outer surface of the metal piece and the aluminum layer of the battery case while securing a large welding area of the outer surface of the metal piece with respect to the aluminum layer.

5. The battery cell according to claim 2, wherein the metal piece has one or more through holes formed therein such that at least a portion of the aluminum layer melted at a time of welding is joined to the metal piece in the through holes.

6. The battery cell according to claim 2, wherein at least a portion of the metal piece is configured to have a tapered structure in which a thickness of the at least a portion of the metal piece is gradually decreased toward the thermally bondable portions.

7. The battery cell according to claim 2, wherein the metal piece is configured to have a structure in which an end of the metal piece facing the thermally bondable portions and a top surface and a bottom surface of the metal piece adjacent to the end of the metal piece protrude outward.

8. The battery cell according to claim 1, wherein the metal piece has a thickness of 0.01 mm to 5 mm.

9. The battery cell according to claim 8, wherein the metal piece has a thickness of 0.1 mm to 3 mm.

10. The battery cell according to claim 1, wherein the metal piece is a plate having a length equivalent to 50% to 100% of a length of each of the thermally bondable portions.

11. The battery cell according to claim 1, wherein the metal piece is made of one or more materials selected from among aluminum, copper, lead, and tin.

12. The battery cell according to claim 1, wherein metal pieces are mounted only in the other second spaces, excluding one second space in which the electrode terminals are located.

13. The battery cell according to claim 1, wherein metal pieces are mounted in parts of one second space in which the electrode terminals are located such that the metal pieces do not contact the electrode terminals, and are mounted in all of the other second spaces.

14. A method of manufacturing a battery cell according to claim 1, the method comprising:
(a) receiving an electrode assembly in a first space together with an electrolyte and placing a cover and a case body such that the cover and the case body face each other to form thermally bondable portions and second spaces;
(b) thermally bonding the thermally bondable portions to form a first sealed portion;
(c) inserting a metal piece into each of the second spaces;
(d) welding the metal piece to a battery case in each of the second spaces using a welder to form a second sealed portion; and
(e) cutting the second sealed portion along a longitudinal direction thereof such that part of the second sealed portion equivalent to 30% to 90% of a width of the second sealed portion is removed.

15. The method according to claim 14, wherein the welding is performed using an ultrasonic bonder or an ultra seam welder.

16. The method according to claim 14, wherein
the case body defines the first space, and the cover extends from one end of the case body or is provided separately from the case body, and
the case body comprises bondable surfaces extending outward from respective ends of the first space, the bondable surfaces facing the cover to define the thermally bondable portions and the second spaces.

17. The method according to claim 16, wherein
the thermally bondable portions are bonded so as to have a width equivalent to 20% to 50% of a width of each of the bondable surfaces, thereby constituting the first sealed portion, and
each of the second spaces is welded to the metal piece so as to have a width equivalent to 50% to 80% of the width of each of the bondable surfaces, thereby constituting a second sealed portion.

18. The method according to claim 17, wherein the step of cutting the second sealed portion comprises cutting the second sealed portion by 50 to 90% of a width thereof in a longitudinal direction in a state in which the second sealed portion is welded to the metal piece.

19. A method of manufacturing a battery cell according to claim 1, the method comprising:
(a) receiving an electrode assembly in a first space together with an electrolyte and placing a cover and a case body such that the cover and the case body face each other to form thermally bondable portions and second spaces;
(b) mounting a metal piece in each of the second spaces adjacent to the thermally bondable portions;
(c) welding the metal piece to a battery case in each of the second spaces using a welder and thermally bonding the thermally bondable portions using heat generated during welding to form a first sealed portion and a second sealed portion; and
(d) cutting the second sealed portion along a longitudinal direction thereof such that part of the second sealed portion equivalent to 30% to 90% of a width of the second sealed portion is removed.

20. A battery module comprising one or more battery cells according to claim 1.

21. A battery pack comprising one or more battery modules according to claim 20.

22. A device comprising a battery pack according to claim 21.

* * * * *